(12) United States Patent
Chang et al.

(10) Patent No.: US 8,462,690 B2
(45) Date of Patent: Jun. 11, 2013

(54) APPARATUS AND METHOD FOR ASYNCHRONOUS CONTROL MESSAGE TRANSMISSION FOR DATA RETRANSMISSION IN WIRELESS RELAY COMMUNICATION SYSTEM

(75) Inventors: Young-Bin Chang, Anyang-si (KR); Taori Rakesh, Suwon-si (KR); Jung-Je Son, Seongnami-si (KR); Chang-Yoon Oh, Yongin-si (KR); Hyoung-Kyu Lim, Seoul (KR); Sung-Jin Lee, Seoul (KR); Hyun-Jeong Kang, Seoul (KR)

(73) Assignee: Samsung Electronics Co., Ltd (KR)

( * ) Notice: Subject to any disclaimer, the term of this patent is extended or adjusted under 35 U.S.C. 154(b) by 847 days.

(21) Appl. No.: 12/059,360

(22) Filed: Mar. 31, 2008

(65) Prior Publication Data
US 2008/0240014 A1    Oct. 2, 2008

(30) Foreign Application Priority Data

Mar. 30, 2007 (KR) .......................... 10-2007-0031624
Apr. 20, 2007 (KR) .......................... 10-2007-0039012

(51) Int. Cl.
*H04W 28/04* (2009.01)
(52) U.S. Cl.
USPC ............. 370/315; 370/243; 714/748; 714/48; 455/7

(58) Field of Classification Search
USPC ............ 370/242, 243, 246, 293, 315; 714/48, 714/748, 749, 751; 455/7, 9, 13.1, 18, 24
See application file for complete search history.

(56) References Cited

U.S. PATENT DOCUMENTS

| | | | |
|---|---|---|---|
| 5,537,414 A | 7/1996 | Takiyasu et al. | |
| 5,898,679 A | 4/1999 | Brederveld et al. | |
| 7,577,399 B2 * | 8/2009 | Eichinger et al. | ............. 455/11.1 |
| 7,813,324 B1 * | 10/2010 | Goel et al. | ..................... 370/336 |
| 8,201,044 B2 * | 6/2012 | Chang et al. | ................... 714/749 |
| 8,224,238 B2 * | 7/2012 | Horiuchi et al. | ............. 455/11.1 |

(Continued)

FOREIGN PATENT DOCUMENTS

| | | |
|---|---|---|
| JP | 2008-060951 | 3/2008 |
| WO | WO 2006/070665 | 7/2006 |

OTHER PUBLICATIONS

Junichi Suga et al., "DL HARQ for Non-Transparent Relays", IEEE 802.16 Broadband Wireless Access Working Group, Mar. 15, 2007.

(Continued)

*Primary Examiner* — Chi Pham
*Assistant Examiner* — Ahmed Elallam
(74) *Attorney, Agent, or Firm* — The Farrell Law Firm, P.C.

(57) ABSTRACT

An apparatus and a method for data retransmission in a multihop relay wireless communication system are provided. The retransmission method includes determining whether an error is detected in data received from an upper node; generating a message indicative of the data error; and sending the message to the upper node at a time that is not appointed with the upper node. Therefore, it is possible to reduce a retransmission delay time that occurs during synchronous retransmission.

26 Claims, 12 Drawing Sheets

U.S. PATENT DOCUMENTS

| | | | | |
|---|---|---|---|---|
| 8,340,027 B2* | 12/2012 | Nanda et al. | | 370/329 |
| 2006/0256740 A1* | 11/2006 | Koski | | 370/278 |
| 2007/0076740 A1* | 4/2007 | Manjeshwar | | 370/432 |
| 2007/0150788 A1* | 6/2007 | Zhuyan | | 714/749 |
| 2007/0153716 A1* | 7/2007 | Fukuzawa et al. | | 370/315 |
| 2007/0190933 A1* | 8/2007 | Zheng et al. | | 455/7 |
| 2007/0298778 A1* | 12/2007 | Chion et al. | | 455/422.1 |
| 2008/0002610 A1* | 1/2008 | Zheng et al. | | 370/328 |
| 2008/0056173 A1 | 3/2008 | Watanabe | | |
| 2008/0248793 A1* | 10/2008 | Chang et al. | | 455/422.1 |
| 2008/0305740 A1* | 12/2008 | Horiuchi et al. | | 455/11.1 |
| 2009/0141676 A1* | 6/2009 | Maheshwari et al. | | 370/329 |

OTHER PUBLICATIONS

Henning Wiemann et al., "A Novel Multi-Hop ARQ Concept", IEEE 61st Vehicular Technology Conference, VTC 2005-Spring, May 30, 2005.

Haihong Zheng et al., "HARQ with Relays", IEEE 802.16 Broadband Wireless Access Working Group, Nov. 15, 2006.

Haihong Zheng et al., "HARQ with Relays", IEEE 802.16 Presentation Submission Template (Rev.8.3), Nov. 15, 2006.

Kanchei (Ken) Loa et al., "Pipeline HARQ in Multi-hop Relay System", IEEE 802.16 Presentation Submission Template (Rev.8.3), Mar. 15, 2007.

* cited by examiner

FIG.12

APPARATUS AND METHOD FOR ASYNCHRONOUS CONTROL MESSAGE TRANSMISSION FOR DATA RETRANSMISSION IN WIRELESS RELAY COMMUNICATION SYSTEM

PRIORITY

This application claims the priority under 35 U.S.C. §119 (a) to a Korean patent application filed in the Korean Intellectual Property Office on Mar. 30, 2007 and assigned Serial No. 2007-31624 and a Korean patent application filed in the Korean Intellectual Property Office on Apr. 20, 2007 and assigned Serial No. 2007-39012, the entire disclosure of which is incorporated herein by reference.

BACKGROUND OF THE INVENTION

1. Field of the Invention

The present invention relates generally to an apparatus and a method for an Automatic Retransmission reQuest (ARQ) in a wireless communication system. More particularly, the present invention relates to an apparatus and a method for an asynchronous ARQ in a multihop relay wireless communication system.

2. Description of the Related Art

In a wireless communication system, particular data may suffer error depending on a channel state of a radio resource that delivers the data. Error controlling and recovering schemes largely include an Automatic Retransmission reQuest (ARQ) scheme and a Forward Error Correction (FEC) scheme. The ARQ scheme requests a transmitter to retransmit the corrupted data of a receiver. The FEC scheme corrects the error of the compromised data of the receiver.

When the wireless communication system adopts the ARQ scheme, the receiver determines whether an error occurs by decoding the received packets. When the received packets are free from error, the receiver sends an Acknowledgement (ACK) signal to the transmitter.

When errors are detected in the received packets, the receiver sends a Negative ACK (NACK) signal to the transmitter.

Upon receiving the ACK message from the receiver, the transmitter transmits new packets. By contrast, when receiving the NACK message from the receiver, the transmitter retransmits the previous packets to the receiver.

Recently, the wireless communication system has adopted a relay scheme using a relay station to provide a better radio channel to a mobile station that travels in a cell boundary or in a shadow area, i.e., the wireless relay communication system can provide a better radio channel between a base station and a mobile station by relaying data between the base station and the mobile station using the relay station.

In order to provide a better radio channel as described above, the wireless relay communication system requires an ARQ method that uses the relay station.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for an ARQ in a multihop relay wireless communication system.

Another aspect of the present invention is to provide an apparatus and a method for asynchronously sending a control message for the ARQ in a multihop relay wireless communication system.

Yet another aspect of the present invention is to provide an apparatus and a method for asynchronously sending an ACK/NACK message for the ARQ in a multihop relay wireless communication system.

The above aspects are achieved by providing a retransmission method of a Relay Station (RS) in a wireless relay communication system. The retransmission method includes determining whether data received from an upper node is detected with contains error; generating a message indicative of the data error; and sending the message to the upper node at a time point that is not appointed with the upper node.

According to one aspect of the present invention, an RS in a wireless relay communication system includes a receiver for receiving data from an upper node; a checker for determining whether errors are present in the received data; a message generator for generating a message which comprises error occurrence information corresponding to the data; and a transmitter for sending the message to the upper node at a time that is not appointed with the upper node.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will become more apparent from the following detailed description taken in conjunction with the accompanying drawings, in which:

FIG. 12 illustrates a feedback header in the multihop relay wireless communication system according to another exemplary embodiment of the present invention.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention provides a technique for asynchronously sending a control message for an Automatic Retransmission reQuest (ARQ) in a wireless relay communication system. While Acknowledgement (ACK)/Negative ACK (NACK) messages of the control messages are illustrated as an example, the present invention is also applicable to other control messages.

Hereinafter, an Orthogonal Frequency Division Multiple Access (OFDMA) wireless communication system is illustrated as an example. Note that the present invention is also applicable to other multiple access communication systems.

Figure 1:
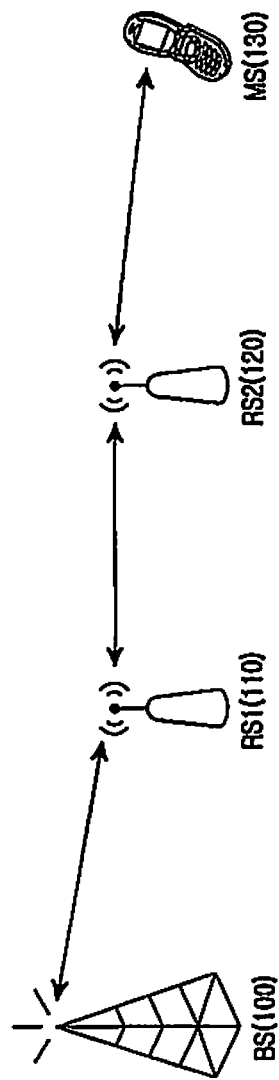
FIG. 1 illustrates a multihop relay wireless communication system according to an exemplary embodiment of the present invention.

The wireless communication system illustrated in FIG. 1 includes three hops. However, the present invention is also applicable to two-hop or a multi-hop wireless communication systems.

FIG. 1 illustrates a multihop relay wireless communication system according to an exemplary embodiment of the present invention.

In the wireless communication system of FIG. 1, a Base Station (BS) 100 services a Mobile Station (MS) 130 in its service coverage through a direct link. When the MS 130 travels in the outskirts of the service coverage or outside the service coverage, the BS 100 services the MS 130 using relay links via Relay Stations (RSs) 110 and 120.

For instance, to transmit data to the MS 130, the BS 100 transmits the data destined for the MS 130 to the first RS 110.

Receiving the data from the BS 100, the first RS 110 determines whether the data has error. When the data is free from error, the first RS 110 forwards the data to the second RS 120. If the data includes the data destined for the MS 130 that is serviced via the first RS 110, the first RS 110 transmits the corresponding data to the MS 130.

Meanwhile, when errors are detected in the data detected, the first RS 110 sends a NACK message corresponding to the data to the BS 100.

The second RS 120, upon receiving the data from the first RS 110, determines whether errors are present in the data. When the data is free from error, the second RS 120 forwards the data to the MS 130.

When errors are detected in the, the second RS 120 sends a NACK message corresponding to the data to the first RS 110.

When receiving the data from the second RS 120, the MS 130 determines whether the data has errors. When the data is free from errors, the MS 130 sends an ACK message corresponding to the data to the second RS 120. When errors are detected in the data, the MS 130 sends a NACK message corresponding to the data to the second RS 120.

As described above, the RSs and the MS of the wireless communication system send ACK messages or NACK messages to the upper node according to the occurrence of errors in the data received from the upper node. The wireless communication system transmits and receives the data and the ACK and NACK messages by a certain data transmission fundamental unit. Hereinafter, it is assumed that the fundamental unit of the data transmission in the wireless communication system is a frame. The frame indicates a Transmission Time Interval (TTI) that is the fundamental physical unit of the data transmission, i.e., the frame indicates the processing delay time taken for one node to receive the data, check the error, and process the data. While it is assumed that the processing delay time is one frame, a processing delay time corresponding to multiple frames may occur according to the capabilities of the BS, the RS, and the MS.

Figure 2:
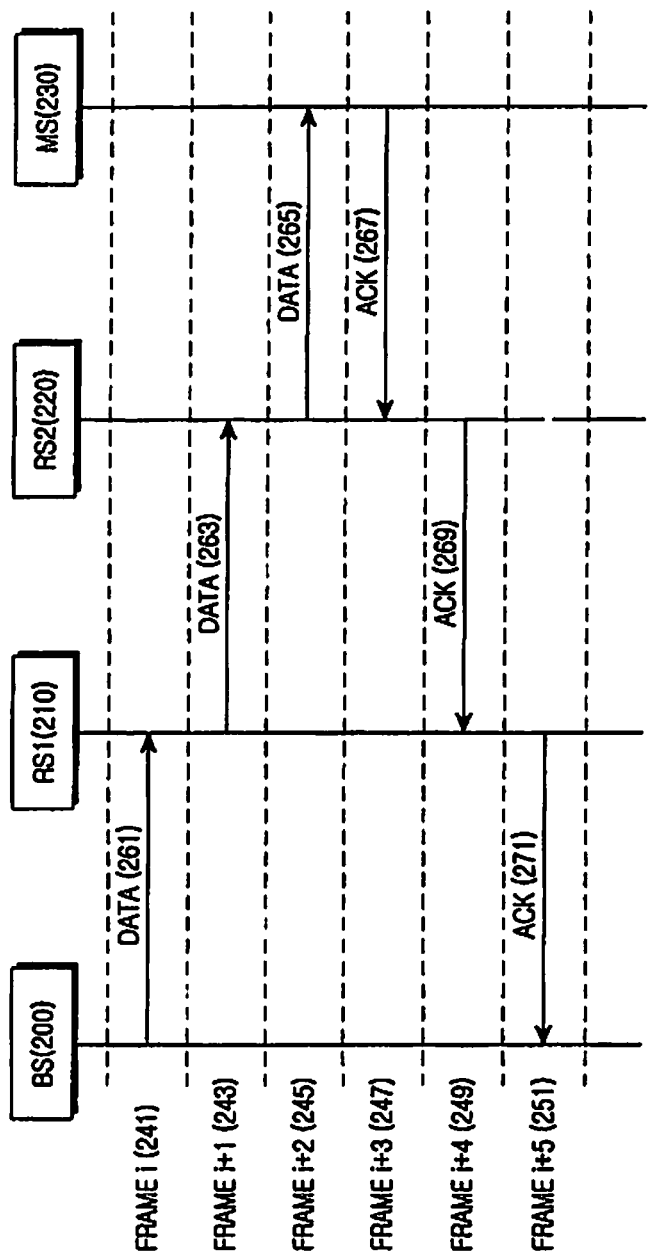
FIG. 2 illustrates a data transmission process in the multihop relay wireless communication system according to an exemplary embodiment of the present invention.

For instance, the wireless communication system sends data and an ACK/NACK message as shown in FIG. 2. It is assumed that the wireless communication system synchronously sends the data and the ACK/NACK message in FIG. 2, i.e., the nodes in the wireless communication system appoint retransmission time points of the data and the ACK/NACK message in advance. Accordingly, the nodes can recognize which data the ACK/NACK message concerns, based on the reception time point of the ACK/NACK message.

FIG. 2 illustrates a data transmission process in the multihop relay wireless communication system according to an exemplary embodiment of the present invention.

To transmit data to an MS 230 in FIG. 2, a BS 200 sends the data to a first RS 210 over the i-th frame 241 in step 261. The first RS 210 determines whether the data received from the BS 200 contains errors. When the data is free from error, the first RS 210 sends the data to a second RS 220 over the (i+1)-th frame 243 in step 263.

The second RS 220 determines whether the data received from the first RS 210 contains errors. When the data is free from error, the second RS 220 forwards the data to the MS 230 over the (i+2)-th frame 245 in step 265.

Receiving the data from the second RS 220, the MS 230 determines whether the data contains errors. When the data does not contain an error, the MS 230 sends an ACK message to the second RS 220 over the (i+3)-th frame 247 in step 267.

Upon receiving the ACK message from the MS 230, the second RS 220 confirms that the ACK message relates to the data sent to the MS 230 over the (i+2)-th frame 245, based on the ACK message reception time information.

In step 269, the second RS 220 sends the ACK message to the first RS 210 over the (i+4)-th frame 249.

Receiving the ACK message from the second RS 220, the first RS 210 confirms that the ACK relates to the data sent to the second RS 220 over the (i+1)-th frame 243, based on the ACK message reception time information.

In step 271, the first RS 210 sends the ACK message to the BS 220 over the (i+5)-th frame 251.

Receiving the ACK message from the first RS 210, the BS 200 confirms that the ACK message relates to the data sent to the first RS 210 over the i-th frame 241, based on the ACK message reception time information.

Figure 3:
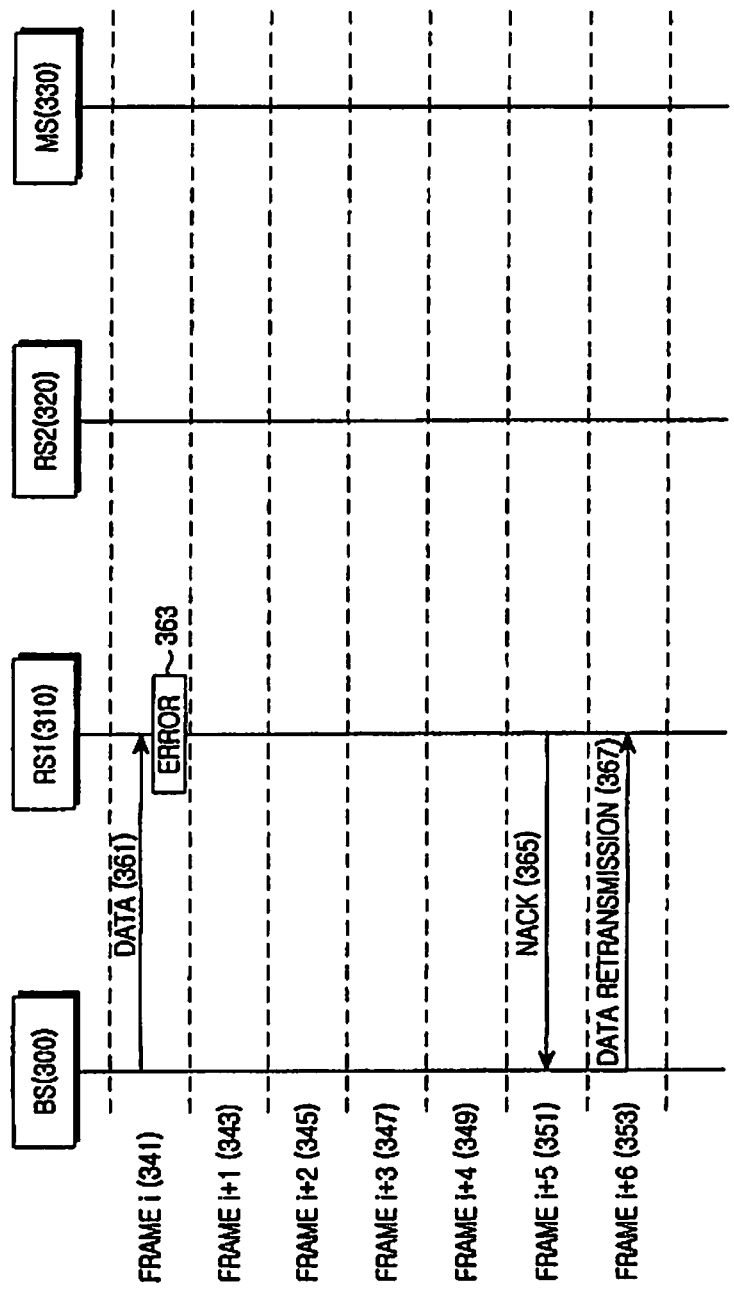
FIG. 3 illustrates a synchronous ARQ process in the multihop relay wireless communication system according to an exemplary embodiment of the present invention.
Figure 4:
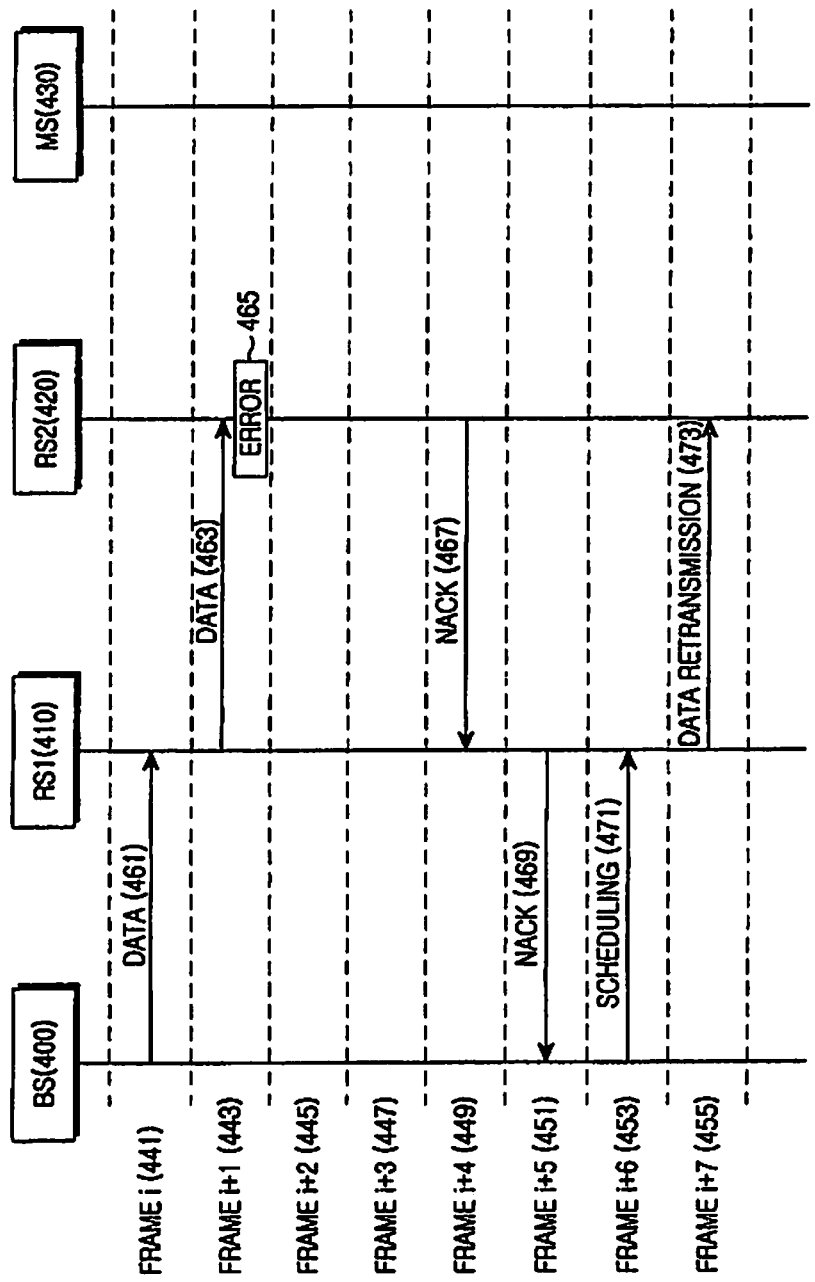
FIG. 4 illustrates a synchronous ARQ process in a multihop relay wireless communication system according to another exemplary embodiment of the present invention.
Figure 5:
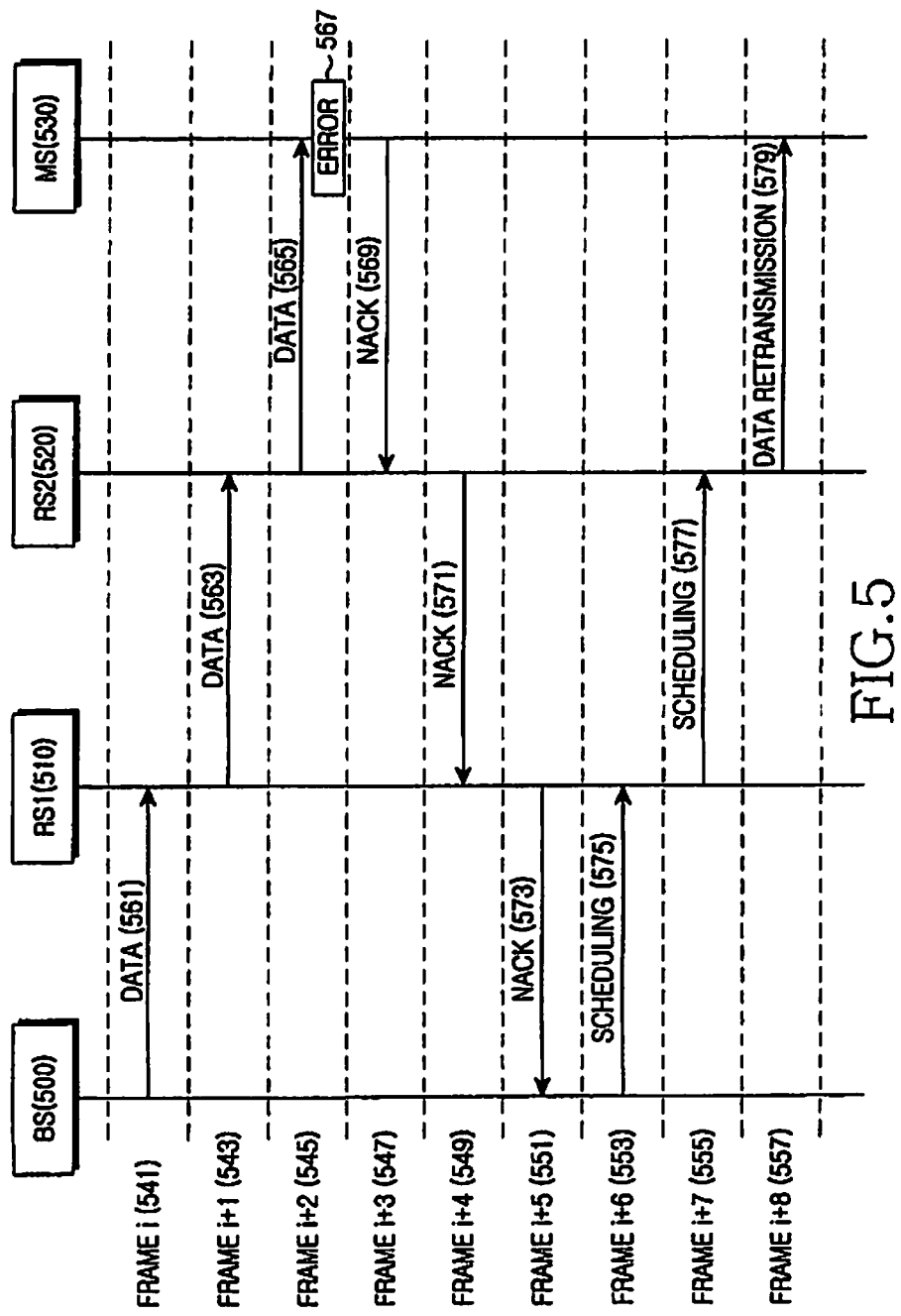
FIG. 5 illustrates a synchronous ARQ process in a multihop relay wireless communication system according to yet another exemplary embodiment of the present invention.

As described above, the BS 200, the RSs 210 and 220, and the MS 230 in the wireless communication system send the data and the ACK/NACK message according to the preset frames. If the data received at the lower nodes from the upper node is corrupted, the wireless communication system operates as shown in FIGS. 3, 4 and 5. Herein, the upper node (the BS or the upper RS) transmits the data scheduling information to the lower nodes by including the frame information for the lower nodes to send the ACK/NACK message.

FIG. 3 illustrates a synchronous ARQ process in the multihop relay wireless communication system according to an exemplary embodiment of the present invention.

To transmit data to an MS 330, a BS 300 transmits the data to a first RS 310 over the i-th frame 341 in step 361.

The first RS 310 determines whether the data received from the BS 300 contains errors. When it is determined that the data contains errors in step 363, the first RS 310 sends a NACK message corresponding to the data to the BS 300 over the (i+5)-th frame 351 according to the ACK/NACK message transmission time pre-appointed with the BS 300 in step 365.

The BS 300 recognizes that the ACK/NACK message corresponding to the data sent to the first RS 310 over the i-th frame 341 is received over the (i+5)-th frame 351. Hence, the first RS 310 does not send the NACK message corresponding to the data from the (i+1)-th frame 343 to the (i+4)-th frame 345, and sends the NACK message corresponding to the data to the BS 300 over the (i+5)-th frame 351.

The BS 300 recognizes that the NACK message received from the first RS 310 over the (i+5)-th frame 351 relates to the data sent to the first RS 310 over the i-th frame 341.

In step 367, the BS 300 retransmits the data to the first RS 310 over the (i+6)-th frame 353 in response to the NACK message.

FIG. 4 illustrates a synchronous ARQ process in a multihop relay wireless communication system according to another exemplary embodiment of the present invention.

To transmit data to an MS 430, a BS 400 transmits the data to a first RS 410 over the i-th frame 441 in step 461.

The first RS 410 determines whether the data received from the BS 400 contains errors. When the data is free from error, the first RS 410 forwards the data to a second RS 420 over the (i+1)-th frame 443 in step 463.

The second RS 420 determines whether the data received from the first RS 410 contains errors. When the data contains errors in step 465, the second RS 420 sends a NACK message corresponding to the data to the first RS 410 over the (i+4)-th frame 449 in step 467.

More specifically, the first RS 410 recognizes the ACK/NACK message corresponding to the data sent to the second RS 420 over the (i+1)-th frame 443 is received in the (i+4)-th frame 449. Hence, the second RS 420 does not send the NACK message corresponding to the data from the (i+2)-th frame 445 to the (i+3)-th frame 447, and sends the NACK message corresponding to the data to the first RS 410 over the (i+4)-th frame 449.

The first RS 410 confirms that the NACK message from the second RS 420 over the (i+4)-th frame 449 relates to the data sent to the second RS 420 over the (i+1)-th frame 443.

In step 469, the first RS 410 forwards the NACK from the second RS 420 to the BS 400 over the (i+5)-th frame 450. The NACK message includes information informing of the data error at the second RS 420.

The BS 400 recognizes that the NACK message received from the first RS 410 over the (i+5)-th frame 451 relates to the data sent to the first RS 410 over the i-th frame 441. Also, the BS 400 confirms that the NACK message pertains to the data corrupted at the second RS 420, based on the information included in the NACK message.

Thus, the BS 400 transmits scheduling information for retransmitting the data over the (i+6)-th frame 453 to the first RS 410 in response to the NACK message in step 471.

Upon receiving the scheduling information, the first RS 410 retransmits the data to the second RS 420 over the (i+7)-th frame 455 according to the scheduling information in response to the NACK message from the second RS 420 in step 473.

FIG. 5 illustrates a synchronous ARQ process in a multihop relay wireless communication system according to yet another exemplary embodiment of the present invention.

To transmit data to an MS 530, a BS 500 transmits the data to a first RS 510 over the i-th frame 551 in step 561.

The first RS 510 determines whether the data received from the BS 500 is detected with error. When the data is free from error, the first RS 510 forwards the data to a second RS 520 over the (i+1)-th frame 543 in step 563.

The second RS 520 determines whether the data received from the first RS 510 has error. When the data is free from error, the second RS 520 forwards the data to the MS 530 over the (i+2)-th frame 545 in step 565.

The MS 530 determines whether the data received from the second RS 520 has error. When the data has error in step 567, the MS 530 sends a NACK message corresponding to the data to the second RS 520 over the (i+3)-th frame 547 in step 569.

The second RS 520 confirms that the NACK message from the MS 530 over the (i+3)-th frame 547 pertains to the data sent to the MS 530 over the (i+2)-th frame 545.

In step 571, the second RS 520 forwards the NACK message from the MS 530 to the first RS 510 over the (i+4)-th frame 549. The NACK message includes information regarding the data error at the MS 530.

The first RS 510 confirms that the NACK message from the second RS 520 over the (i+4)-th frame 549 pertains to the data sent to the second RS 520 over the (i+1)-th frame 543. The first RS 510 confirms that the NACK message pertains to the data compromised at the MS 530 based on the information included to the NACK message.

In step 573, the first RS 510 forwards the NACK message from the second RS 520 to the BS 500 over the (i+5)-th frame 551. The NACK message includes information informing of the data error at the MS 530.

The BS 500 confirms that the NACK message received from the first RS 510 over the (i+5)-th frame 551 pertains to the data sent to the first RS 510 over the i-th frame 541. The BS 500 confirms that the NACK message relates to the data compromised at the MS 530 based on the information included to the NACK message.

Hence, the BS 500 transmits the scheduling information for retransmitting the data over the (i+6)-th frame 553 in response to the NACK message, to the first RS 510 in step 575.

The first RS 510 forwards the scheduling information from the BS 500 to the second RS 520 over the (i+7)-th frame 555 in step 577.

Upon receiving the scheduling information, the second RS 520 retransmits the data to the MS 530 over the (i+8)-th frame 557 in response to the NACK message provided from the MS 530 according to the scheduling information in step 579.

As explained above, as the nodes of the wireless communication system transmit and receive the control messages at the predefined transmission times, the overhead of the control messages can be mitigated. However, when errors are detected in the data provided from the upper node, the lower nodes, receiving the compromised data, wait for the transmission of the control message up to the predefined time. As a result, a retransmission delay time is lengthened.

Figure 6:
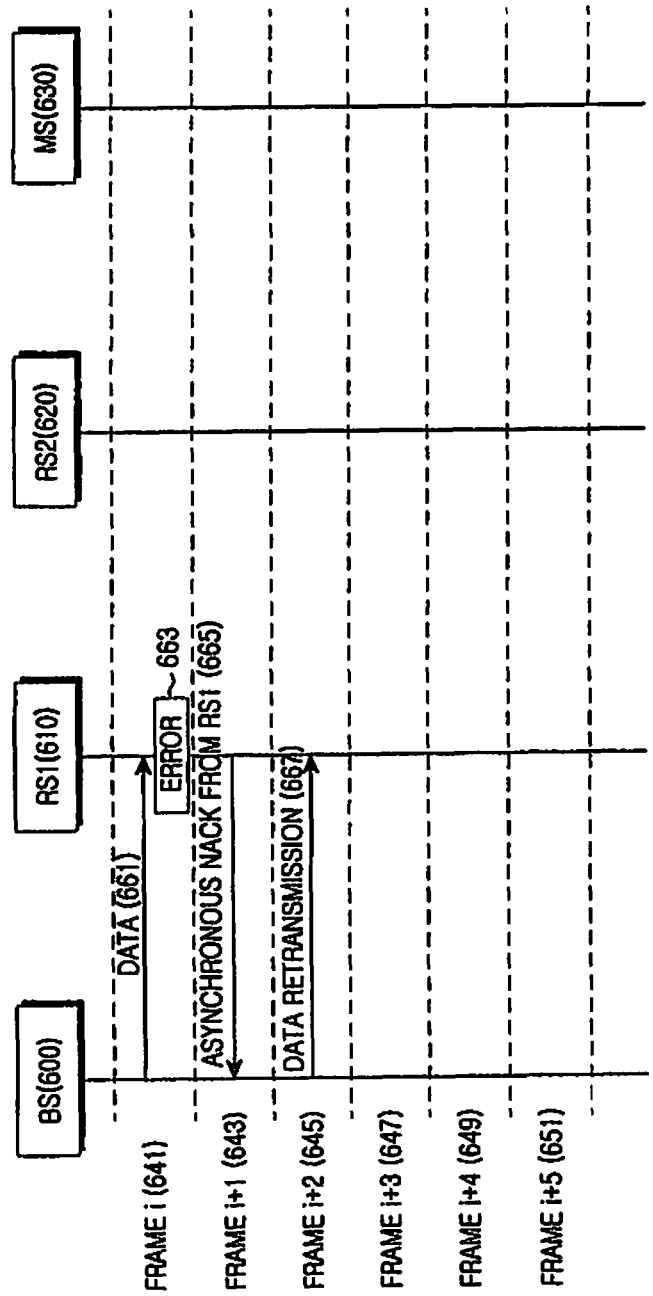
FIG. 6 illustrates an asynchronous ARQ process in the multihop relay wireless communication system according to an exemplary embodiment of the present invention.
Figure 7:
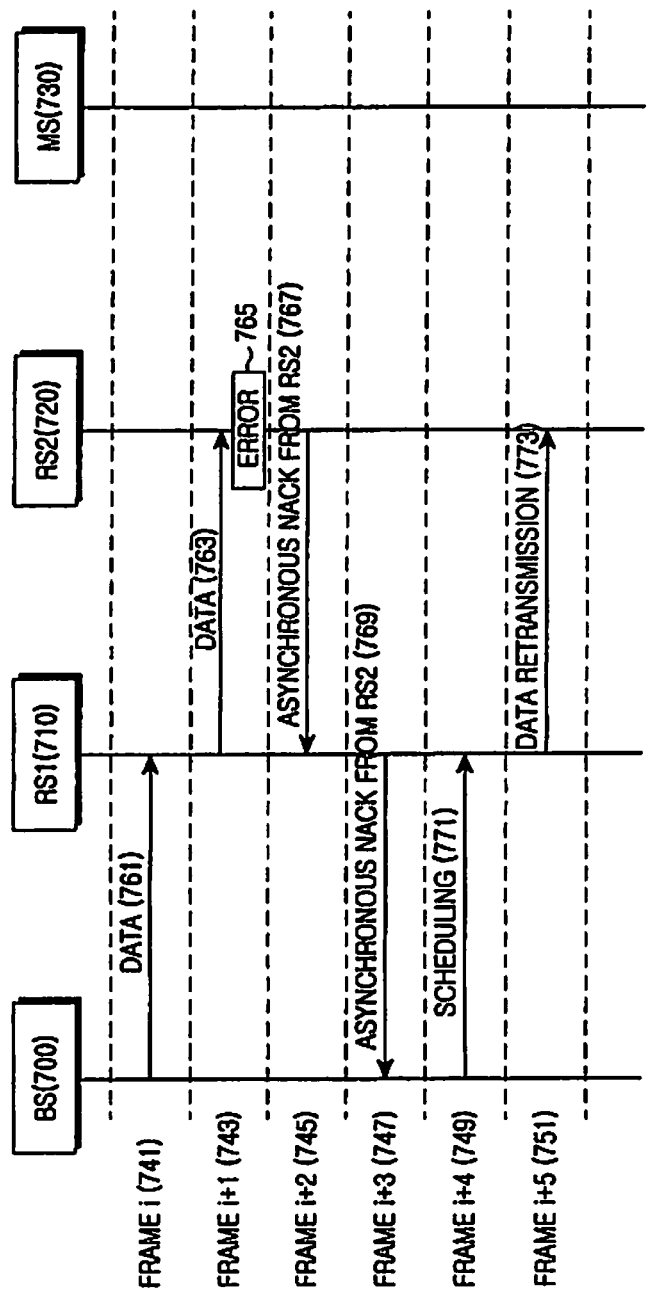
FIG. 7 illustrates an asynchronous ARQ process in the multihop relay wireless communication system according to another exemplary embodiment of the present invention.
Figure 8:
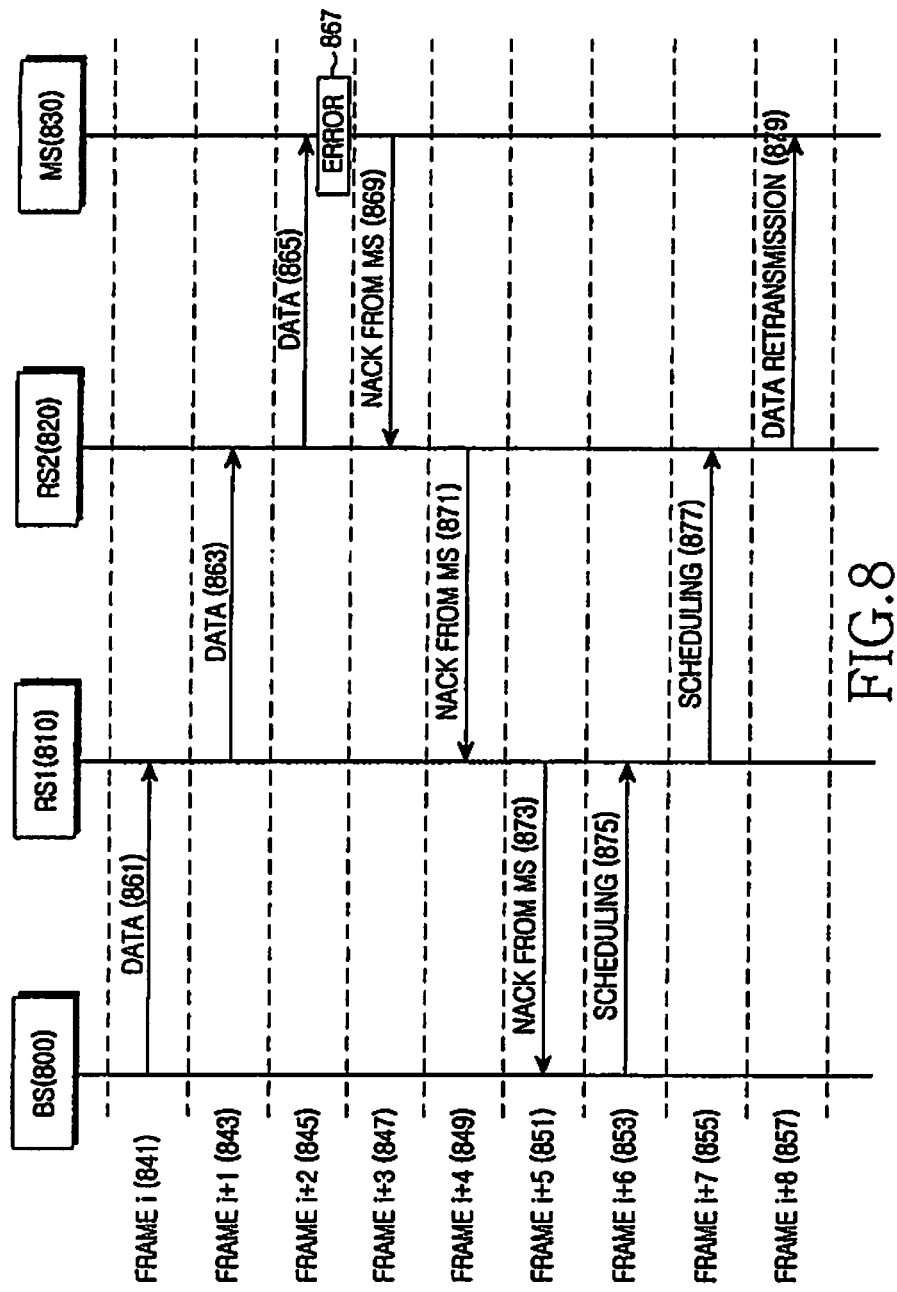
FIG. 8 illustrates an asynchronous ARQ process in the multihop relay wireless communication system according to yet another exemplary embodiment of the present invention.

To reduce the retransmission delay time, the wireless communication system asynchronously transmits the control message as shown in FIGS. 6, 7 and 8.

FIG. 6 illustrates an asynchronous ARQ process in the multihop relay wireless communication system according to an exemplary embodiment of the present invention.

To transmit data to an MS 630, a BS 600 of FIG. 6 transmits the data to a first RS 610 over the i-th frame 641 in step 661.

The first RS 610 determines whether the data received from the BS 600 contains errors. When errors are detected in the data in step 663, the first RS 610 sends a NACK message corresponding to the data to the BS 600 in the (i+1)-th frame 643 in step 665.

In doing so, the first RS 610 sends the NACK message at an unspecific time that is not appointed with the BS 600. Hence, the first RS 610 sends additional information of the NACK message together so that the BS 600 can determine which node sends the NACK message or which data the NACK message pertains to. Herein, the additional information of the NACK message includes unique IDentification (ID) information of the first RS 610 and unique ID information of data to indicate which data the NACK message pertains to. When a Hybrid ARQ (HARQ) is employed, the nodes can divide the data to partial data and then transmit the partial data. Accordingly, the additional information of the NACK message should further include unique ID information of the partial data. When the first RS 610 transmits additional information, of not only the NACK message, but also the ACK message, the additional information further includes information that indicates the additional information of the NACK message or the ACK message.

For example, when the control message for the additional information of the NACK message is constituted according to the Institute of Electrical and Electronics Engineers (IEEE) 802.16 standard, the additional information includes a Connection ID (CID) of the first RS 610 and a Block Sequence Number (BSN) indicative of a serial number of the data.

Using the HARQ, the additional information includes the CID or a Reduced CID (RCID) of the first RS 610, and a HARQ Channel ID (ACID) indicative of the serial number of the HARQ data or a Sub Packet ID (SPID), which is a unique ID of a partial data of the ACID.

When the first RS 610 sends the additional information of not only the NACK message but also the ACK message, each transmission of additional information further includes information indicative of the additional information of the NACK message or the ACK message.

Figure 11:
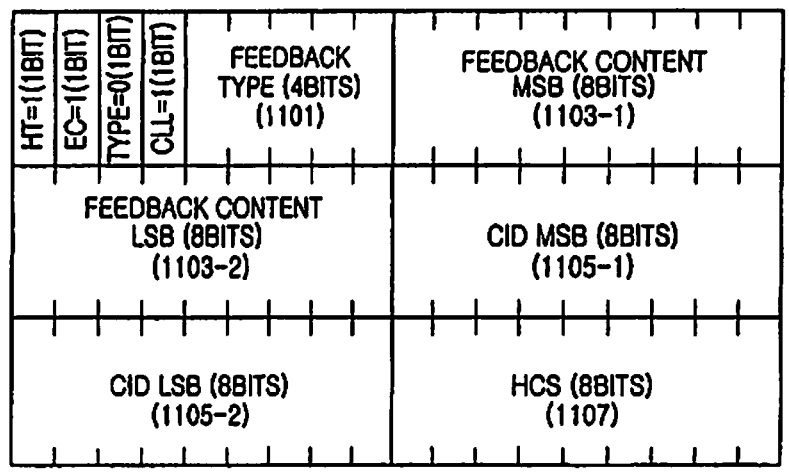
FIG. 11 illustrates a feedback header in the multihop relay wireless communication system according to an exemplary embodiment of the present invention.
Figure 12:
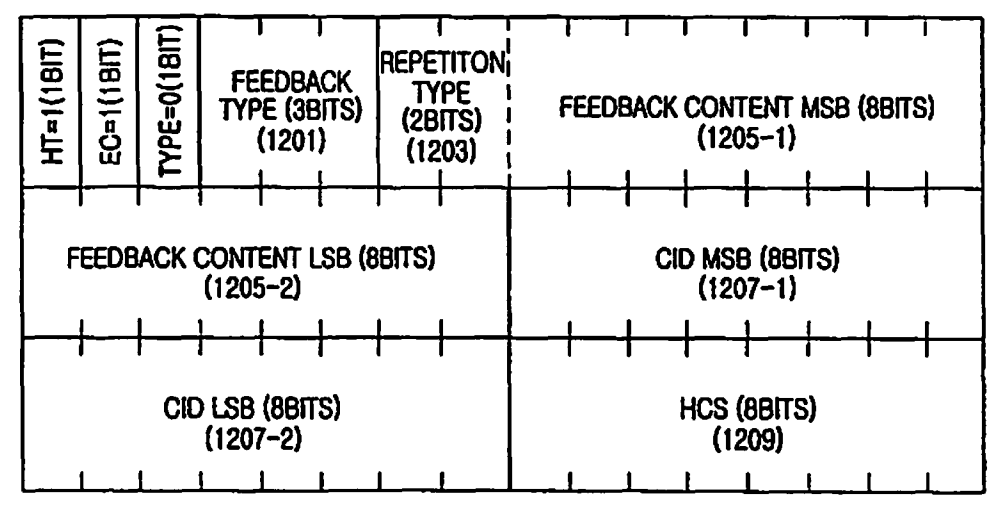

Alternatively, the first RS 610 can constitute the ACK/NACK message using a feedback header of the IEEE 802.16 standard as shown in FIG. 11 or 12.

In a manner described above, the first RS 610 can send the additional information of the NACK signal as the control message or using a separate physical channel.

The BS 600 recognizes that the NACK message pertains to the data sent to the first RS 610 over the i-th frame 641, based on the additional information of the NACK message received from the first RS 610.

Thus, the BS 600 retransmits the data of the NACK message to the first RS 610 over the (i+2)-th frame 645 to the first RS 610 in step 667.

FIGS. 11 and 12 illustrate the ACK/NACK message constitution using the frame header defined in a Medium Access Control (MAC) signaling header type II of the IEEE 802.16 standard. To indicate the MAC signaling header type II of the IEEE 802.16 standard, both of a Header Type (HT) field and an Encryption Control (EC) field of the frame header have the value '1'.

FIG. 11 illustrates the feedback header in the multihop relay wireless communication system according to an exemplary embodiment of the present invention.

When the type field is set to zero and the CID Inclusion Indication (CII) field is set to 1 in FIG. 11, the feedback header includes a feedback type field 1101, a feedback content field 1103, a CID field 1105, and a Header CheckSum (HCS) 1107.

The feedback type field 1101 indicates that the ACK or NACK information for the bitmap data in the feedback content field 1103 is included. According to the value of the feedback type field 1101, the feedback header can indicate whether the bitmap information in the feedback content field 1103 is repeated or not. For example, when the type field 1101 contains a value of 1100, the feedback content field 1103 carries the ACK/NACK information for 16 data using 16 bits. When the value of the type field 1101 has a value of 1101, the feedback content field 1103 contains two-time repeated ACK/NACK information for 8 data using 16 bits.

The feedback content field 1103 is a 16-bit bitmap and each bit indicates ACK or NACK information for each data. The bitmap arranges the ACK/NACK information of the data in the order of the downlink map.

The CID field 1105 contains ID information of the node that transmits the ACK/NACK information through the feedback content field 1103.

The HCS field 1107 carries information for checking for errors of the feedback header.

FIG. 12 illustrates a feedback header in the multihop relay wireless communication system according to another exemplary embodiment of the present invention.

When the type field is set to 1 in FIG. 12, the feedback header includes a feedback type field 1201, a repetition type field 1203, a feedback content field 1205, a CID field 1207, and a HCS 1209.

The feedback type field 1201 indicates that ACK or NACK information for bitmap data in the feedback content field 1205 is included.

The repetition type field 1203 indicates the repetition information of the bitmap information in the feedback content field 1205. For example, when the value of the repetition type field 1203 is 00, the feedback content field 1205 contains ACK/NACK information for 16 data units using 16 bits. When the value of the repetition type field 1203 is 01, the feedback content field 1205 contains two-time repeated ACK/NACK information for 8 data units using 16 bits. When the value of the repetition type field 1203 is 10, the feedback content field 1205 carries ACK/NACK information for 4 data using 16 bits, which is repeated four times. When the value of the repetition type field 1203 is 11, the feedback content field 1205 carries ACK/NACK information for 2 data using 16 bits, which is repeated eight times.

The feedback content field 1205 is a 16-bit bitmap and each data unit indicates the ACK/NACK information for each data. The bitmap arranges the ACK/NACK information of the data in the order of the downlink map.

The CID field 1207 carries ID information of the node that transmits the ACK/NACK information through the feedback content field 1205.

The HCS field 1209 carries information for checking for errors in the feedback header.

FIG. 7 illustrates an asynchronous ARQ process in the multihop relay wireless communication system according to another exemplary embodiment of the present invention.

To transmit data to an MS 730 in FIG. 7, a BS 700 transmits the data to a first RS 710 over the i-th frame 741 in step 761.

The first RS 710 determines whether the data received from the BS 700 contains errors. When the data is free from errors, the first RS 710 forwards the data to a second RS 720 over the (i+1)-th frame 743 in step 763.

The second RS 720 determines whether the data received from the first RS 710 contains errors. When errors are detected in the data in step 765, the second RS 720 sends a NACK message regarding the corrupted data to the first RS 710 over the (i+2)-th frame 745 in step 767. The second RS 720 sends additional information of the NACK message to the first RS 710. Herein, the second RS 720 can constitute the additional information in the same manner as the additional information generated by the first RS 610 of FIG. 6.

The first RS 710 recognizes that the NACK message pertains to the data sent to the second RS 720 over the (i+1)-th frame 743, based on the additional information of the NACK message received from the second RS 720.

In step 769, the first RS 710 forwards the NACK message from the second RS 720 to the BS 700 over the (i+3)-th frame 747. The first RS 710 also sends the additional information of the NACK message received from the second RS 720 to the BS 700.

The BS 700 recognizes based on the additional information of the NACK message received from the first RS 710 that the NACK message pertains to the data sent to the second RS 720 over the (i+1)-th frame 743.

Hence, the BS 700 transmits scheduling information for the data transmission to the first RS 710 over the (i+4)-th frame 749 in step 771.

Upon receiving the scheduling information, the first RS 710 retransmits the data to the second RS 720 over the (i+5)-th frame 751 according to the scheduling information in response to the NACK message from the second RS 720 in step 773.

FIG. 8 illustrates an asynchronous ARQ process in the multihop relay wireless communication system according to yet another exemplary embodiment of the present invention. Herein, when the MS 830 requests the data retransmission as shown in FIG. 8, the asynchronous retransmission and the synchronous retransmission have the same delay time. Accordingly, when the MS 830 requests the data retransmission, it is more efficient to employ the synchronous retransmission of FIG. 8 than the asynchronous retransmission that requires the separate additional information.

To transmit data to an MS 830 in FIG. 8, a BS 800 transmits the data to a first RS 810 over the i-th frame 881 in step 861.

The first RS 810 determines whether the data received from the BS 800 contains errors. When the data is free from errors, the first RS 810 forwards the data to a second RS 820 over the (i+1)-th frame 843 in step 863.

The second RS 820 determines whether the data received from the first RS 810 contains errors. When the data is free from errors, the second RS 820 forwards the data to the MS 830 over the (i+2)-th frame 848 in step 868.

The MS 830 determines whether errors are detected in the data received from the second RS 820. When the data is corrupted in step 867, the MS 830 sends a NACK message for the errored data to the second RS 820 over the (i+3)-th frame 847 in step 869.

The second RS 820 recognizes that the NACK message received from the MS 830 over the (i+3)-th frame 847 pertains to the data sent to the MS 830 over the (i+2)-th frame 845.

In step 871, the second RS 820 forwards the NACK message from the MS 830 to the first RS 810 over the (i+4)-th frame 849. The NACK message includes information informing of the data error at the MS 830.

The first RS 810 recognizes that the NACK message from the second RS 820 relates to the data sent to the second RS 820 over the (i+1)-th frame 843. The first RS 810 also recognizes, based on the information in the NACK message, that the NACK message pertains to the data erred at the MS 830.

In step 873, the first RS 810 forwards the NACK message from the second RS 820 to the BS 800 over the (i+5)-th frame 851. The NACK message includes information informing of the data error at the MS 830.

The BS 800 recognizes that the NACK message from the first RS 810 relates to the data sent to the first RS 810 over the i-th frame 841. Based on the information in the NACK message, the BS 800 recognizes that the NACK message pertains to the data corrupted at the MS 830.

Thus, the BS 800 transmits scheduling information for the data transmission to the first RS 810 over the (i+6)-th frame 853 in response to the NACK message in step 875.

In step 877, the first RS 810 forwards the scheduling information from the BS 800 to the second RS 820 over the (i+7)-th frame 855.

Receiving the scheduling information from the first RS 810, the second RS 820 retransmits the data to the MS 830 over the (i+8)-th frame 857 to the MS 830 in response to the NACK message from the MS 830 in step 879.

As described above, the lower nodes of the wireless communication system asynchronously transmit the control message to the upper node, i.e., the lower nodes transmit the control message at the time point that is not appointed with the upper node. Hence, the lower nodes assemble the additional information of the control message sent to the upper node and transmit the additional information together with the control message to the upper node. If the lower nodes asynchronously transmit not only the NACK message but also the ACK message, the lower nodes can assemble the additional information of the ACK message in the same manner as the additional information of the NACK message. In this case, the additional information includes the information indicative of the additional information of the NACK message or the ACK message.

Now, when the wireless communication system employs the asynchronous retransmission, the operations of the RS are explained.

Figure 9:
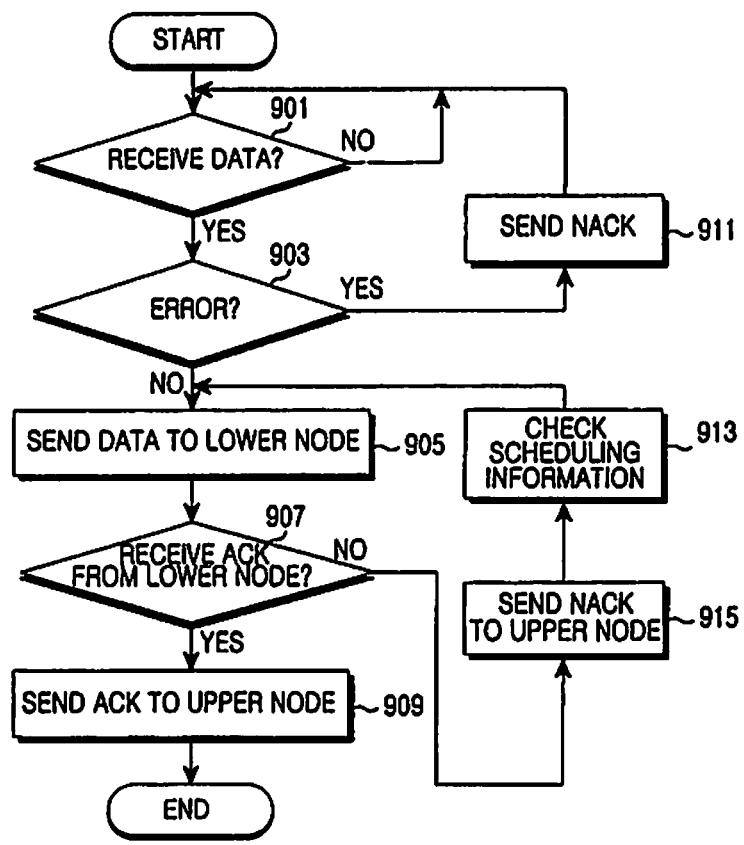
FIG. 9 illustrates operations of a relay station for the asynchronous ARQ in the multihop relay wireless communication system according to an exemplary embodiment of the present invention.

FIG. 9 illustrates the operations of the RS for the asynchronous ARQ in the multihop relay wireless communication system according to an exemplary embodiment of the present invention.

In step 901, the RS determines whether data is received from its upper node (the BS or the upper RS).

When receiving the data, the RS determines whether errors are present in the data in step 903. For instance, the RS determines the presence of errors by applying a Cyclic Redundancy Check (CRC) code to the data.

When the data contains errors, the RS sends a NACK message corresponding to the data to the upper node at a time point that is not appointed with the upper node in step 911. The RS sends the NACK message and additional information of the NACK message to the upper node. Herein, the additional information includes unique ID information of the RS and unique ID information indicating which data the NACK message pertains to. Using the HARQ, the additional information should further include unique ID information of the partial data.

Next, the RS goes back to step 901 and determines whether the data is retransmitted from the upper node.

By contrast, when the data has no error in step 903, the RS forwards the data to a lower node (e.g., a lower RS or an MS) in step 905.

In step 907, the RS determines whether an ACK message is received from the lower node.

Receiving a NACK message from the lower node, the RS forwards the NACK message from the lower node to the upper node in step 915. When receiving the NACK message from the lower node at an unspecific time point, the RS can acquire information of the lower node that sends the NACK message and the compromised data based on the additional information of the NACK message. The RS forwards the NACK message from the lower node and the additional information of the NACK message to the upper node.

In step 913, the RS receives retransmission-scheduling information from the upper node.

Next, the RS returns to step 905 and retransmits the data, which is assembled according to the additional information of the NACK message, to the lower node that sends the NACK message according to the scheduling information. Alternatively, the RS may transmit the retransmission scheduling information to the lower node that sends the NACK message. In more detail, when the NACK message from the lower node signifies that the data is corrupted at another lower node connected to the lower node, the RS forwards the retransmission scheduling information to the lower node.

When receiving the ACK message from the lower node in step 907, the RS forwards the ACK message from the lower node to the upper node in step 909.

Next, the RS finishes this process.

Hereafter, the structure of the RS for the asynchronous retransmission in the wireless communication system is illustrated.

Figure 10:
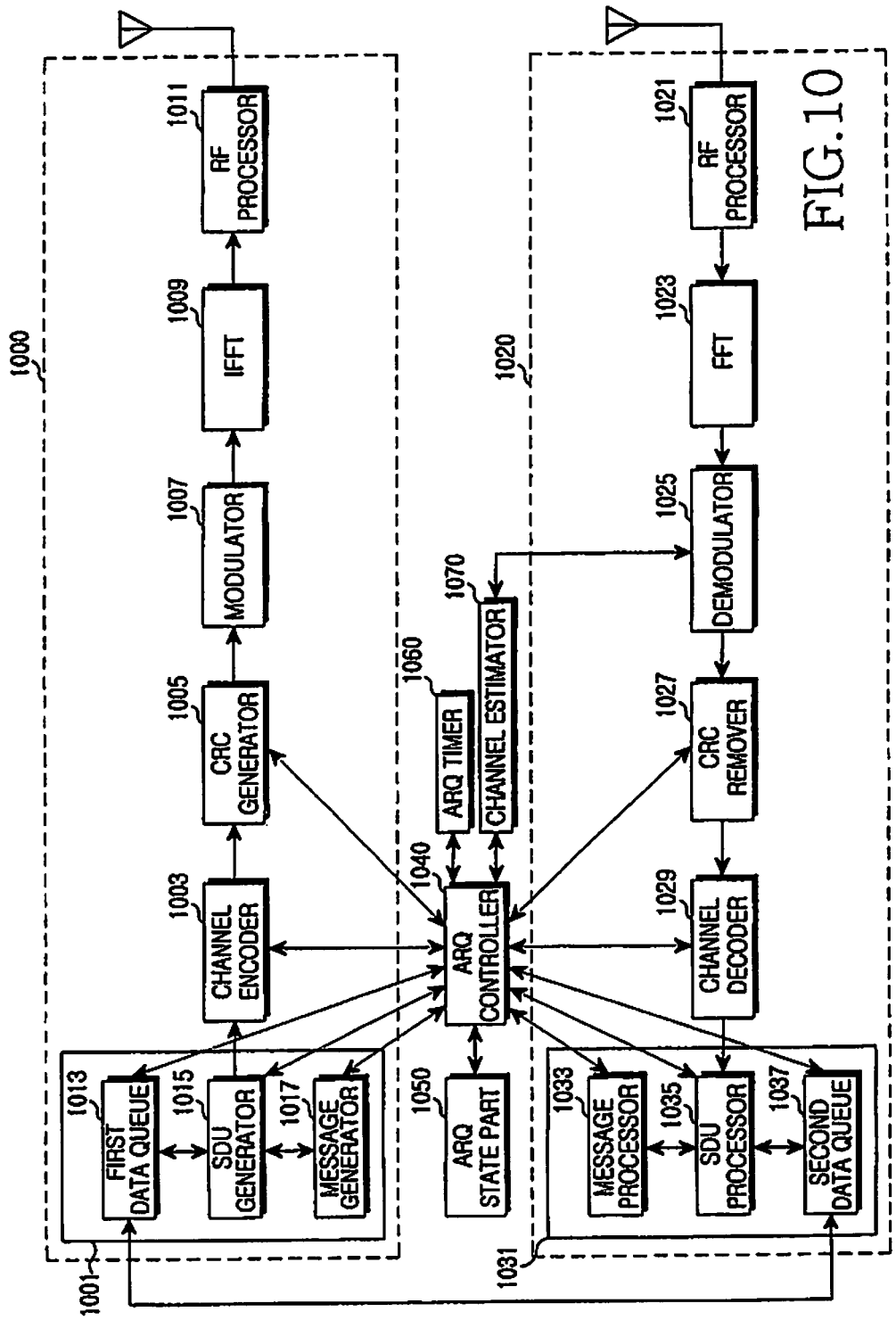
FIG. 10 illustrates the relay station in the multihop relay wireless communication system according to an exemplary embodiment of the present invention.

FIG. 10 is a block diagram of the RS in the multihop relay wireless communication system according to an exemplary embodiment of the present invention. While it is assumed that a transmitter 1000 and a receiver 1020 use different antennas, the transmitter 1000 and the receiver 1020 may share one antenna.

The RS of FIG. 10 includes the transmitter 1000, the receiver 1020, an ARQ controller 1040, an ARQ state part 1050, an ARQ timer 1060, and a channel estimator 1070, which are shared by the transmitter 1000 and the receiver 1020.

The transmitter 1000 includes a data generator 1001, a channel encoder 1003, a CRC generator 1005, a modulator 1007, an Inverse Fast Fourier Transform (IFFT) operator 1009, and a Radio Frequency (RF) processor 1011.

The data generator 1001 aggregates data stored to a data queue 1013 and a control message generated at a message generator 1017 in a Service Data Unit (SDU) generator 1015 and generates one data unit for the physical layer transmission. Herein, when the data received through the receiver 1020 is detected with no error, the message generator 1017 generates an ACK control message. When the data has error, the message generator 1017 generates a NACK message. The message generator 1017 generates additional information of the NACK message so that the upper node can know which node sends the NACK message and which data the NACK message relates to. For example, the message generator 1017 generates additional information that includes the unique ID information of the RS and the unique ID information of the data to indicate which data the NACK message pertains to. Using HARQ, the message generator 1017 further includes the unique ID information of the partial data to the additional information.

The channel encoder 1003 encodes the data output from the data generator 1001 at a corresponding modulation level (e.g., Modulation and Coding Scheme (MCS) level). The CRC generator 1005 generates and inserts a CRC code to the data output from the channel encoder 1003.

The modulator 1007 modulates the data output from the CRC generator 1005 at the corresponding modulation level (e.g., MCS level).

The IFFT operator 1009 IFFT-processes and converts the frequency-domain data output from the modulator 1007 to a time-domain signal.

The RF processor 1011 up-converts the baseband signal output from the IFFT operator 1009 to an RF signal and outputs the RF signal to the upper node or the lower node via an antenna.

The receiver 1020 includes an RF processor 1021, an FFT operator 1023, a demodulator 1025, a CRC remover 1027, a channel decoder 1029, and a data processor 1031.

The RF processor 1021 down-converts the RF signal received on the antenna from the upper node or the lower node to a baseband signal.

The FFT operator 1023 FFT-processes and converts the time-domain signal output from the RF processor 1021 to a frequency-domain signal.

The demodulator 1025 demodulates the signal output from the FFT operator 1023 at the corresponding modulation level. The demodulator 1025 outputs the demodulated signal to the CRC remover 1027 and the channel estimator 1070.

The CRC remover 1027 determines whether the signal contains an error by checking the CRC code of the signal output from the demodulator 1025. The CRC remover 1027 eliminates the CRC code from the signal output from the demodulator 1025.

The channel decoder 1029 decodes the error-free signal output from the CRC remover 1027 at the corresponding modulation level.

An SDU processor 1035 of the data processor 1031 splits the data and the control message from the physical layer signal output from the channel decoder 1029. Next, the SDU processor 1025 provides and stores the data to a second data queue 1037, decodes the control message and provides the control message to a message processor 1033. Herein, the first data queue 1013 and the second data queue 1027 can be the same data queue.

When the NACK control message is received from the lower node, the message processor 1033 informs the ARQ controller 1040 of the reception of the NACK. The message processor 1033 confirms which lower node sends the NACK control message and which data the NACK control message relates to, using the additional information of the NACK control message received from the lower node.

The ARQ state part 1050 manages the ARQ state for the retransmitted data. The ARQ timer 1060 manages a life-time for the retransmission of the RS.

The ARQ controller 1040 controls the ARQ operations of the RS in association with the ARQ state part 1050 and the ARQ timer 1060. The ARQ controller 1040 controls the retransmission as communicating with the data generator 1001, the channel encoder 1003, and the CRC generator 1005 of the transmitter 1000. For example, when the retransmission request is received from the lower node through the receiver 1020, the ARQ controller 1040 controls the transmitter 1000 to send the retransmission request signal to the upper node. When the retransmission scheduling information is received from the upper node, the ARQ controller 1040 controls to encode the data received from the upper node and stored to the data queue 1013 according to the channel condition, to insert the CRC code, and to retransmit the data to the lower node which requests the retransmission.

The ARQ controller 1040 controls the retransmission as communicating with the data processor 1031, the channel decoder 1029, and the CRC remover 1027 of the receiver

1020. For example, when the data received from the CRC remover 1027 is detected with error, the ARQ controller 1040 controls the message generator 1017 to generate the NACK control message to be sent to the BS.

Receiving a lifetime expiration message from the ARQ timer 1060 in the process of the retransmission, the ARQ controller 1040 finishes the retransmission process.

As set forth above, as the multihop relay wireless communication system asynchronously retransmits the data, the retransmission delay time, which occurs during synchronous retransmission, can be reduced.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A retransmission method of a Relay Station (RS) in a wireless relay communication system, the method comprising:
   receiving data from an upper node;
   determining whether the data contains an error;
   sending a Negative Acknowledgement (NACK) message to the upper node at a time that is not pre-appointed with the upper node, when the data contains an error;
   transmitting the data to a lower node, when the data does not contain an error;
   when a NACK is received from the lower node, forwarding the NACK to the upper node and retransmitting the data to the lower node; and
   when an ACK is received from the lower node, forwarding the ACK to the upper node at a time that is pre-appointed with the upper node.

2. The retransmission method of claim 1, wherein sending the NACK message comprises:
   generating the NACK message as a control message or a header, when the received data contains the error; and
   sending the NACK message to the upper node at the time that is not pre-appointed with the upper node.

3. The retransmission method of claim 2, wherein generating the NACK message comprises:
   when the NACK message is generated as the control message, generating the NACK message in response to corrupted data, and a NACK-type control message comprising additional information corresponding to the NACK message.

4. The retransmission method of claim 2, wherein the control message comprises at least one of a first unique IDentifier (ID) information corresponding to the RS, a second unique ID information corresponding to data indicative of the error, and, a third unique ID information corresponding to partial data if the data is the partial data.

5. The retransmission method of claim 2, wherein the control message comprises at least one of Connection ID (CID) information corresponding to the RS and Block Sequence Number (BSN) information corresponding to the data to indicate the error.

6. The retransmission method of claim 2, wherein, in a physical layer retransmission, the control message comprises at least one of a CID or a Reduced CID (ACID) of the RS, and a Hybrid Automatic Repeat reQuest (HARQ) Channel ID (ACID) of the data to indicate the error or a Sub Packet ID (SPID) of partial data of the ACID.

7. The retransmission method of claim 2, wherein the header comprises ACK information corresponding to at least one uncorrupted data unit, and NACK information corresponding to at least one corrupted data unit.

8. The retransmission method of claim 2, wherein the header comprises at least one of ID information corresponding to the RS, error occurrence information corresponding to at least one data unit provided from the upper node, repetition of error occurrence information, and information corresponding to a number of repetitions.

9. The retransmission method of claim 8, wherein the header comprises the error occurrence information corresponding to the data provided from the upper node as a bitmap.

10. The retransmission method of claim 9, wherein the header comprises a bitmap indicative of the error of the data in an order of data included in a downlink map provided from the upper node.

11. The retransmission method of claim 1, wherein the upper node is a base station or an upper RS.

12. The retransmission method of claim 1, further comprising:
    when at least one of the NACK message and additional information corresponding to the NACK message is received from the lower node, checking data for the NACK message, transmitting at least one of the NACK message for the checked data and the additional information corresponding to the NACK message to the upper node; and
    when retransmission-scheduling information is received from the upper node, retransmitting the checked data to the lower node according to the scheduling information or transmitting the scheduling information to the lower node.

13. The retransmission method of claim 1, wherein the lower node is a lower RS or a mobile station.

14. A Relay Station (RS) in a wireless relay communication system, comprising:
    a receiver for receiving data from an upper node; and
    a transmitter for sending a Negative Acknowledgement (NACK) message to the upper node at a time that is not pre-appointed with the upper node when the received data contains an error, transmitting the data to a lower node when the data does not contain an error, forwarding a NACK to the upper node and retransmitting the data to the lower node when the NACK is received from the lower node, and forwarding an ACK to the upper node at a time that is pre-appointed with the upper node when the ACK is received from the lower node.

15. The RS of claim 14, wherein the transmitter comprises a message generator for generating the NACK message of the received data as a control message or a header message, when the received data contains the error.

16. The RS of claim 15, wherein, when the NACK message is generated as the control message, the message generator generates the NACK message in response to corrupted received data and a NACK-type control message comprising additional information corresponding to the NACK message.

17. The RS of claim 15, wherein the message generator generates the control message, which comprises at least one of a first unique IDentifier (ID) information corresponding to the RS, a second unique ID information corresponding to data indicative of the error, and, a third unique ID information corresponding to partial data if the data is the partial data.

18. The RS of claim 15, wherein the message generator generates the control message, which comprises at least one of Connection ID (CID) information corresponding to the RS and Block Sequence Number (BSN) information corresponding to the data to indicate the error.

19. The RS of claim 15, wherein the message generator, in a physical layer retransmission, generates the control message, which comprises at least one of a CID or a Reduced CID (ACID) of the RS, and a Hybrid Automatic Repeat reQuest (HARQ) Channel ID (ACID) of the data indicative of the error or a Sub Packet ID (SPID) of partial data of the ACID.

20. The RS of claim 15, wherein the message generator generates the header message, which comprises ACK information corresponding to at least one uncorrupted data unit and NACK information corresponding to at least one corrupted data unit.

21. The RS of claim 15, wherein the message generator generates the header message which comprises at least one of ID information corresponding to the RS, error occurrence information corresponding to at least one unit of data provided from the upper node, repetition of the error occurrence information, and information corresponding to a number of repetitions.

22. The RS of claim 15, wherein the message generator generates the header message, which comprises the error occurrence information corresponding to the data provided from the upper node as a bitmap.

23. The RS of claim 22, wherein the message generator generates the header message, which comprises a bitmap indicative of the error in the data, in an order of data included to a downlink map provided from the upper node.

24. The RS of claim 14, wherein, when an error is not detected in the data received from the upper node, the transmitter forwards the data to a lower node.

25. The RS of claim 24, wherein the lower node is a lower RS or a mobile station.

26. The RS of claim 14, wherein the upper node is a base station or an upper RS.

* * * * *

UNITED STATES PATENT AND TRADEMARK OFFICE
CERTIFICATE OF CORRECTION

PATENT NO.        : 8,462,690 B2
APPLICATION NO.   : 12/059360
DATED             : June 11, 2013
INVENTOR(S)       : Chang et al.

Page 1 of 1

It is certified that error appears in the above-identified patent and that said Letters Patent is hereby corrected as shown below:

On the Title Page, Item [75]:

"Jung-Je Son, Seongnami-si" should be -- Jung-Je Son, Seongnam-si --.

Signed and Sealed this
Fourth Day of February, 2014

Michelle K. Lee
*Deputy Director of the United States Patent and Trademark Office*